United States Patent [19]

Leiber

[11] 4,076,330
[45] Feb. 28, 1978

[54] DETECTING APPARATUS FOR A LOCK PREVENTION SYSTEM FOR DETECTING WEAR OF VEHICLE BRAKES

[75] Inventor: Heinz Leiber, Leimen, Germany

[73] Assignee: Robert Bosch GmbH, Stuttgart, Germany

[21] Appl. No.: 767,860

[22] Filed: Feb. 11, 1977

[30] Foreign Application Priority Data

Feb. 14, 1976  Germany .............................. 2606012

[51] Int. Cl.$^2$ ............................................. B60T 17/22
[52] U.S. Cl. ..................................... 303/92; 188/1 A; 340/52 F
[58] Field of Search ............... 188/1 A, 181 A, 181 R; 303/1, 92, 93, 100; 340/52 A, 52 B, 52 F, 52 R

[56] References Cited

U.S. PATENT DOCUMENTS

| 3,750,101 | 7/1973 | Granlund | 303/92 X |
| 3,767,272 | 10/1973 | Leiber | 188/1 A X |
| 3,975,706 | 8/1976 | Kato | 188/1 A X |

FOREIGN PATENT DOCUMENTS 2,257,194  1/1975  France ............................. 340/52 F Primary Examiner—Duane A. Reger
Attorney, Agent, or Firm—Edwin E. Greigg

[57] ABSTRACT

A detecting apparatus for detecting brake wear and which is used with a wheel lock prevention system. The detecting device utilizes some of the components of the wheel lock prevention system and as such includes a detector, an electric circuit for the detector, a monitoring device to insure the proper operation of the system and a brake lining wear-indicating device. The detector includes a pulse generator connected to an electronic switch and to a brake lining wear-indicating device.

7 Claims, 3 Drawing Figures

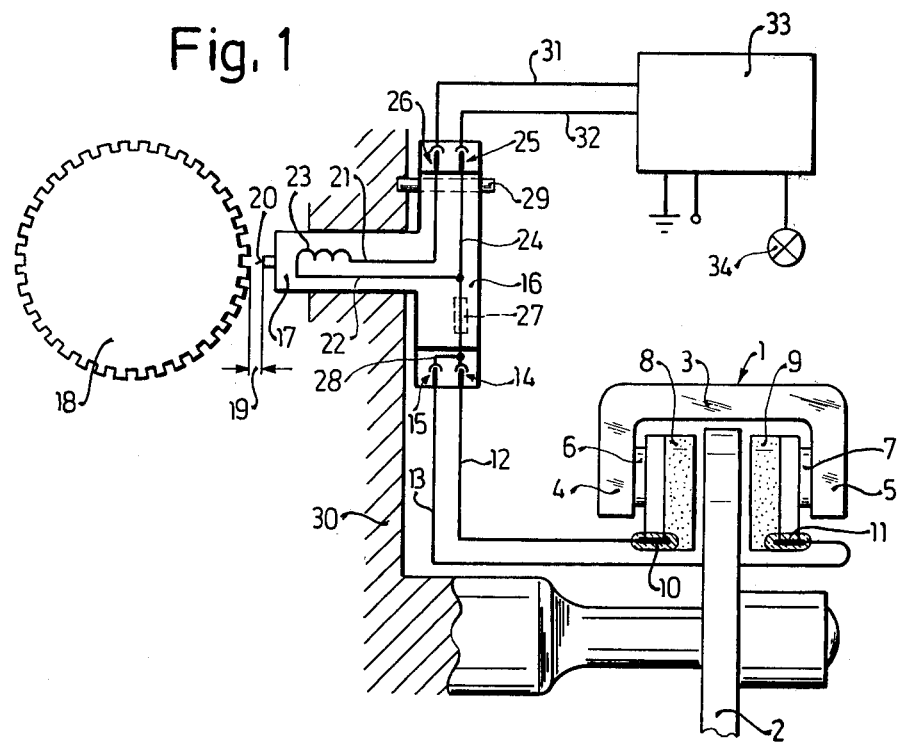
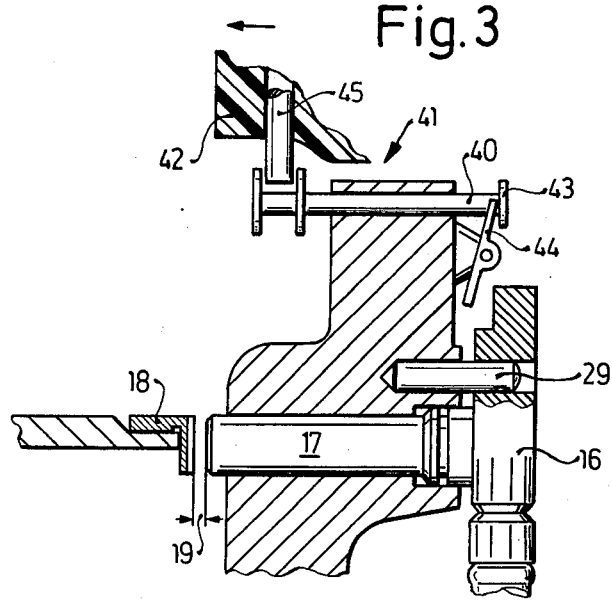

DETECTING APPARATUS FOR A LOCK PREVENTION SYSTEM FOR DETECTING WEAR OF VEHICLE BRAKES

BACKGROUND OF THE INVENTION

The present invention relates to a detecting apparatus used with a wheel lock prevention system, the apparatus being used to detect wear of the vehicle brakes. The apparatus comprises a detector having a pulse generator disposed opposite to a pulse wheel and connected to an electronic switch by way of an electric circuit, and a monitoring device designed to ensure correct operation of the wheel lock prevention system. Such a detecting apparatus is known.

In recent years, there has been an increasing tendency to incorporate into the motor vehicle a device for indicating the wear conditions of the vehicles brake linings, at least on the front wheels to detect a critical lining wear. Electrical devices are mainly employed, although, mechanical devices, even in part, are used. Such wear-indicating devices are important since, when the brake linings are worn out, a dangerous traveling condition can arise in that the brake produces varying braking forces. This can also result in damage to the brake drum or even the disc brake in the case of a prolonged weak braking with worn out linings, and in high repair costs.

Furthermore, when a brake system is designed to include a wheel lock prevention system care should be taken to reduce both the cost of the system itself and the cost of its installation, e.g., the cost of the pulse generator. For example, laying of electric wires leading to the mobile front wheels requires a multiplicity of pulse generators for the system.

OBJECT AND SUMMARY OF THE INVENTION

The principal object of the present invention is to provide a motor vehicle brake system with both a wheel lock prevention system and a brake lining wear-detecting apparatus which is less costly to install.

This object is attained by utilizing components of the wheel lock prevention system with the brake lining wear-detecting device and specifically by connecting the pulse generator of the wheel lock prevention system with the brake lining wear-detecting device.

BRIEF DESCRIPTION OF THE DRAWINGS

Two embodiments of the present invention are illustrated in the drawings, in which:

FIG. 1 diagrammatically illustrates a first embodiment of the present invention including the wheel lock prevention components and the detecting device;

FIG. 3 diagrammatically illustrates another embodiment of the detecting device.

DESCRIPTION OF THE PREFERRED EMBODIMENTS

Figure 2:
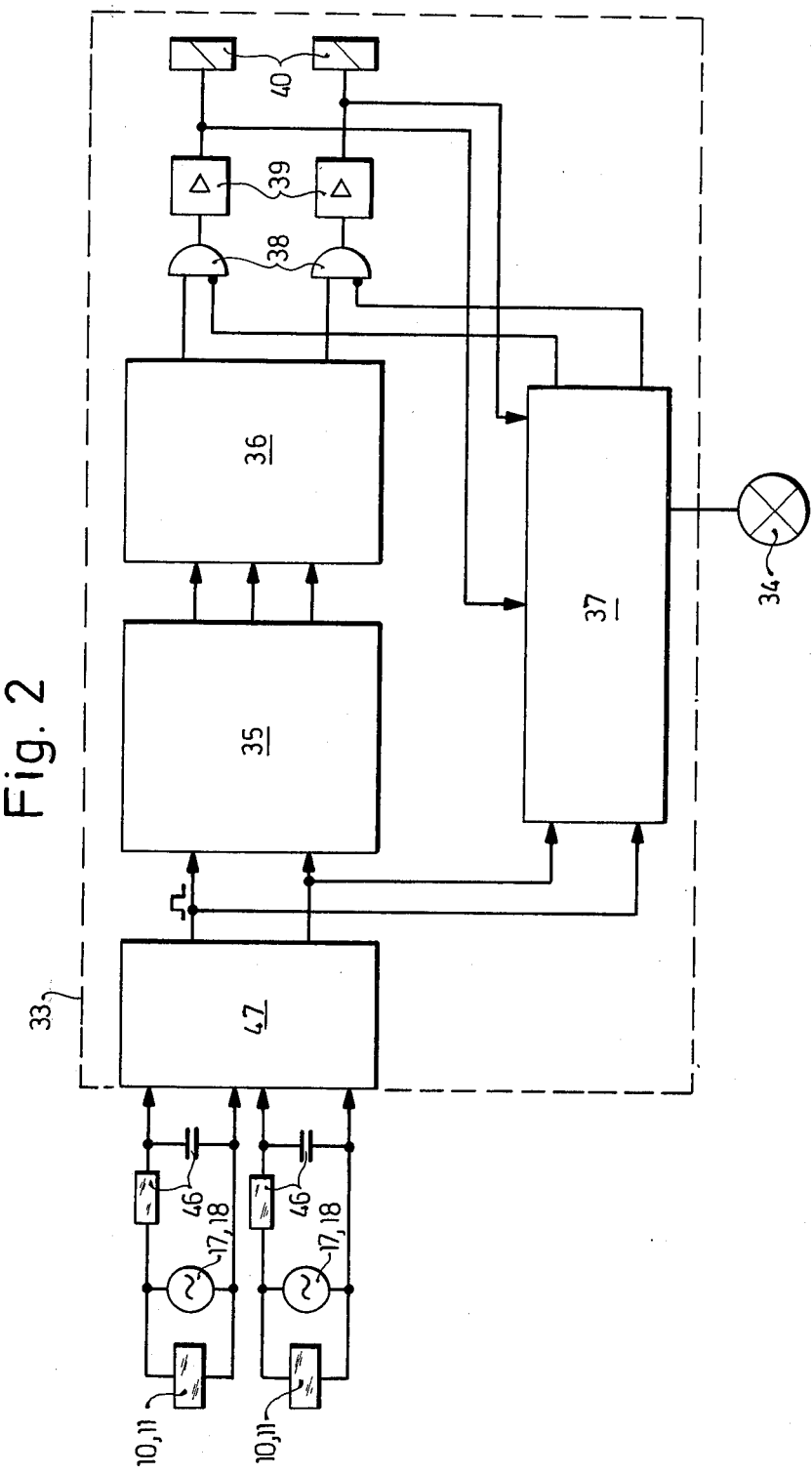
FIG. 2 is a block diagram of a monitoring device of the wheel lock prevention system.

Referring to FIG. 1, there is shown a wheel brake constructed as a disc brake. The wheel brake has a brake lining wear-indicating device 1, including a friction disc 2 designed to be engaged on both faces by a brake head 3. The brake head 3 has two side walls 4 and 5, on which there are provided two pistons 6 and 7 carrying brake linings 8 and 9 at their ends facing the brake disc 2. The brake linings 8 and 9 are adapted to engage the brake disc 2. The brake linings 8 and 9 are new and have a given depth with respect to terminals 10 and 11 which come into contact with the brake disc 2 during a braking stroke of the pistons 6 and 7 when the linings 8 and 9 have been worn to a point of replacement.

The terminals 10 and 11 are connected to a carrier 16 of a pulse generator 17 of the wheel lock prevention system by way of terminal-signal wires 12 and 13 and plug connections 14 and 15. The system also has a toothed wheel (pulse wheel) 18, which together with the pulse generator 17 form a detector 17/18 of the wheel lock prevention system. The pulse wheel 18 which is fixed to, and rotatable with, a vehicle wheel (not shown) can rotate past a front surface 20 of the pulse generator 17, while leaving an air gap 19.

An electric circuit in the pulse generator 17 comprises wires 21 and 22 and a coil 23 located close to the front surface 20. The wires 21, 22 are connected, on the one hand, to a wire connection 24 between the plug connection 14 and a plug connection 25; and, on the other hand, to a plug connection 26. It should be also noted that the connection 24 may include a resistor 27, that before the plug connection 15 a wire length 28 leads to the wire connection 24, and that the carrier 16 is attached to a fixed part 30 of the vehicle by means of a dowel pin 29.

As described above, the terminal-signal wires 12 and 13 are connected in parallel to the pulse generator 17.

Two wires 31 and 32 extend from the plug connections 25 and 26 to an electronic control unit 33 of the wheel lock prevention system. The control unit 33 includes a wheel lock prevention circuit and a safety monitoring device. The monitoring device is shown in detail in FIG. 2, while FIG. 1 shows only a warning light 34 in detail.

The above-described arrangement operates as follows: Should the disc brake reach its lining wear limit in the brake linings 8 and 9, the corresponding terminal 10 or 11 establishes a short-circuit connection with the brake disc 2 connected to ground. The coil 23 of the pulse generator 17 will then be completely or partly (when using the resistor 27) short-circuited. This results in the corresponding speed signal of the pulse generator 17 disappearing, or in other words in a stronger current flowing through the corresponding signal wire. This current can be processed by the monitoring device in the control unit 33, thereby turning on the warning light 34.

FIG. 2 shows the monitoring device in detail, the corresponding parts shown in FIG. 1 being indicated by the same reference numerals. Many wheel lock prevention systems utilize such a monitoring device, or a device similar thereto, which, upon malfunctioning of the detectors 17/18, or the magnetic valves, or any of the electronic circuitry, disconnects the corresponding control channel or even the entire regulator in order to prevent critical prolongation of the stopping distance or yawing of the vehicle.

The same monitoring device can then be employed, according to the present invention, for the proposed double circuit purpose as well. If, upon actuation of the wear contact at the terminal 10 or 11, the pulse generator 17 fails to operate, this situation will be detected by the monitoring device of the control unit 33. A corresponding output signal is applied to a simple gate circuit to cut off the power stage for the wheel lock prevention control element. The monitoring device can be adjusted by means of the resistor 27 in the terminal-signal wire 12 or 13 so that, for example, the corresponding control channel is disconnected only in the lower speed range.

The circuit can be further improved such as by providing a current responsive device in the circuit of the pulse generator 17. By this method, it is possible to avoid having a control channel disconnected, for example, during braking.

The described method also has the advantage that it can be more rapidly checked by a diagnostic apparatus during an inspection. The current responsive circuit must be also combined with a signal from an input amplifier, so that, from the circuit design point of view, it is used, for example, only in a standstill condition when the pulse generator 17 does not generate pulses.

Besides an electrical indication of the lining wear, it is also possible to obtain an indirect indication of the lining wear in a mechanical way. This type of construction is illustrated in FIG. 3 where a pin 40 of a brake lining wear-indicating device 41 is coupled to a brake lining 42 by a pin 45. The pin 40 has a head 43 which can act on the carrier 16 of the pulse generator 17 through a lever 44 so that the carrier 16 is displaced along its dowel pin 29. Such a displacement results in an increase of the air gap 19 of the pulse generator 17. The displacement of the carrier 16 and consequently the air gap 19 is varied in proportion to the extent that the brake shoe is displaced in the direction of the arrow due to wear. Consequently, the signal amplitude is small at least within a small speed range. This fact is detected and indicated by the monitoring device of FIG. 2.

Here are two pairs of terminals 10 and 11 connected over one each pulse generator 17, 18 and over one each input filter 46 to a control unit 33. Parts of the control unit 33 are a signal amplifier and pulse forming device 47, an speed signal matching unit 35, an logic part 36, a control member 37, two OR-gates 38, two power amplifiers 39 and two solenoid valves 40.

The signal amplifier and pulse forming device 47 also measures the current when the vehicle is stationary.

What is claimed is:

1. In combination, a detecting apparatus and a wheel locking prevention system for vehicle brakes, comprising:
   a detector including a pulse generator, a pulse wheel disposed opposite to the pulse generator and pulse circuit;
   an electronic switch connected to the pulse circuit;
   a monitoring device which insures a correct operation of the wheel locking prevention system; and
   a brake lining wear-indicating device connected to the pulse generator.

2. The combination as defined in claim 1, wherein the pulse circuit is speed responsive.

3. The combination as defined in claim 1, wherein the detecting apparatus is used to measure the current in the pulse circuit particularly when the vehicle is stationary.

4. The combination as defined in claim 1, wherein the brake lining wear-indicating device includes at least one brake lining, a pin, means connecting the pin to the pulse generator and further means connecting the pin to the at least one brake lining, said pin serving to adjust the position of the pulse generator relative to the pulse wheel thereby adjusting the air gap between the pulse generator and the pulse wheel, and wherein this adjustment is detected by the monitoring device.

5. The combination as defined in claim 1, wherein the pulse generator is electrically connected to the brake lining wear-indicating device by an electrical circuit which is connected to and in parallel with the pulse circuit.

6. The combination as defined in claim 5, wherein the brake linging wear-indicating device includes a pair of brake linings, and wherein the pulse circuit is at least partly short-circuited by the brake disc when it engages at least one of the brake linings to engage the electrical circuit which is connected to the pulse circuit.

7. The combination as defined in claim 6, wherein the pulse circuit includes a resistor.

* * * * *